(12) United States Patent
Ganesan et al.

(10) Patent No.: US 10,496,510 B2
(45) Date of Patent: Dec. 3, 2019

(54) GENERATING COMBINED EVENT LOGS IN AN INFORMATION HANDLING SYSTEM

(71) Applicant: DELL PRODUCTS, L.P., Round Rock, TX (US)

(72) Inventors: Vaideeswaran Ganesan, Bangalore (IN); Pravin Janakiram, Bangalore (IN); Rajib Saha, Bangalore (IN); Prasoon Sinha, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/495,393

(22) Filed: Apr. 24, 2017

(65) Prior Publication Data

US 2018/0307545 A1 Oct. 25, 2018

(51) Int. Cl.
| | |
|---|---|
| G06F 3/00 | (2006.01) |
| G06F 11/30 | (2006.01) |
| G06F 9/54 | (2006.01) |
| G06F 11/07 | (2006.01) |

(52) U.S. Cl.
CPC .......... *G06F 11/3072* (2013.01); *G06F 9/542* (2013.01); *G06F 11/0766* (2013.01); *G06F 2201/86* (2013.01)

(58) Field of Classification Search
CPC ....................................................... G06F 9/54
USPC ....................................................... 719/310
See application file for complete search history.

(56) References Cited

U.S. PATENT DOCUMENTS

| | | | |
|---|---|---|---|
| 5,889,982 A * | 3/1999 | Rodgers | G06F 9/4812 712/229 |
| 7,502,888 B2 * | 3/2009 | Fowles | G06F 9/52 711/130 |
| 8,122,290 B2 | 2/2012 | Walton et al. | |
| 2002/0116248 A1 * | 8/2002 | Amit | G06F 9/485 718/102 |
| 2013/0318505 A1 * | 11/2013 | Rhee | G06F 11/3636 717/128 |
| 2014/0289573 A1 | 9/2014 | Bennah et al. | |

OTHER PUBLICATIONS

Lei Liu, A Software Memory Partition Approach for Eliminating Bank-level Interference in Multicore Systems. (Year: 2012).*

* cited by examiner

Primary Examiner — Lechi Truong
(74) Attorney, Agent, or Firm — Isidore PLLC (57) ABSTRACT

A method, an information handling system (IHS), and an event logging system generate combined event logs in an IHS. The method includes receiving, via a remote access controller (RAC), a tagged log containing operating system (OS) event data. A hardware log containing hardware event data is retrieved from a RAC memory. The tagged log and the hardware log are combined to form a combined event log containing both OS event data and hardware event data in a uniform format. The combined event log is stored to the RAC memory.

17 Claims, 6 Drawing Sheets

| OS Event Source 320 | OS Event ID 330 | RAC subsystem component 340 | Alert 350 | OS Severity 360 | Hardware Severity 370 |
|---|---|---|---|---|---|
| SDS Drivers | 10x | STOR | Yes | Critical | Critical |
| SDS Drivers | 20x | PDR | No | Warning | Warning |
| SDS Drivers | 30x | VDR | No | Normal | Normal |

FIG. 3

| Alert Severity 10 | Date & Time 420 | Message ID 430 | Source 440 | Message Details 450 |
|---|---|---|---|---|
| Critical | 2016-22-11 T06:28:05 | VDRMSSD304 ←432 | OS | One or more drives hosting data for storage space 0034 have failed or are missing |
| Warning | 2016-24-11 T11:13:42 | VDRLVM001 | OS | Device Mapper Reload Failed |
| Normal | 2016-25-11 T02:11:17 | PSU3782 | Hardware | Power Supply Failure |

400

460 → Critical row
470 → Warning row
480 → Normal row

GENERATING COMBINED EVENT LOGS IN AN INFORMATION HANDLING SYSTEM

BACKGROUND

1. Technical Field

The present disclosure generally relates to information handling systems and in particular to generating combined event logs in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Software defined storage (SDS) is a data storage software for policy-based provisioning and management of data storage which is independent of the underlying hardware. SDS typically includes a form of storage virtualization to separate the storage hardware from the software that manages the hardware. The software enabling SDS can also provide policy management for features such as data deduplication, replication, thin provisioning, snapshots, and backup. When SDS is used with an information handling system, errors or problems that are detected during operation are recorded to separate log files in several de-centralized locations. Unfortunately, when problems occur during the use of SDS in an information handling system, multiple log files have to be analyzed to determine the root of the problem. Also, conflicts can arise during the analysis because each of the multiple log files contains different formats and different component structures that are supported by various operating systems and hardware.

BRIEF SUMMARY

Disclosed are a method, an information handling system (IHS), and an event logging system for generating combined event logs in an IHS.

According to one embodiment, a computer-implemented method of providing a combined event log in an IHS includes receiving, via a remote access controller (RAC), a tagged log containing operating system (OS) event data. The method further includes retrieving, from a RAC memory, a hardware log containing hardware event data. The tagged log and the hardware log are combined to form the combined event log containing both OS event data and hardware event data in a uniform format. The combined event log is stored to the RAC memory.

According to another embodiment, an IHS includes a processor communicatively coupled to a system memory and (RAC communicatively coupled to the processor and to a RAC memory device. The RAC includes first firmware executing thereon to provide a combined event log. The first firmware configures the RAC to receive a tagged log containing operating system (OS) event data and to retrieve, from the RAC memory, a hardware log containing hardware event data. The RAC combines the tagged log and the hardware log to form the combined event log containing both OS event data and hardware event data, and the RAC stores the combined event log to the RAC memory.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS) and an event logging system for generating combined event logs in an IHS.

According to one embodiment, the method includes receiving, via a remote access controller (RAC), a tagged log containing operating system (OS) event data. The method further includes retrieving from a RAC memory device a hardware log containing hardware event data. The tagged log and the hardware log are combined to form a combined event log containing both OS event data and hardware event data. The combined event log is stored to the RAC memory device.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
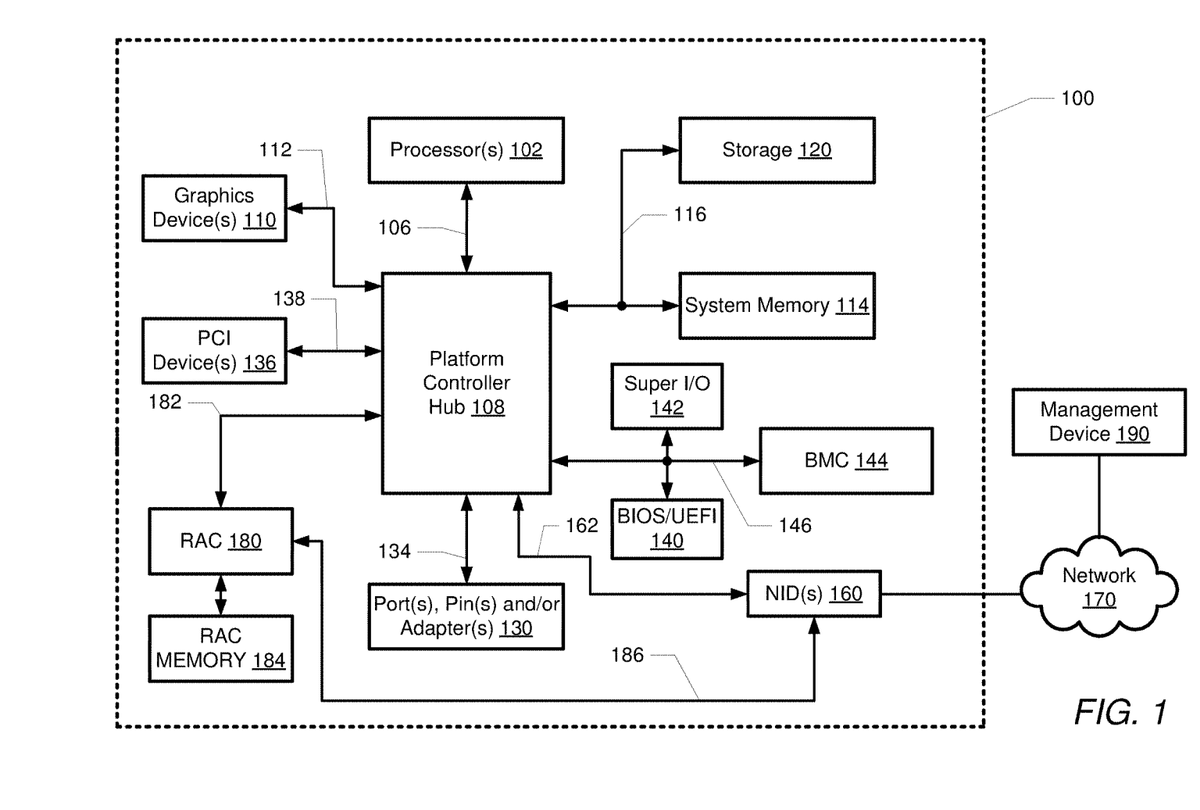
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 may include any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to a chipset or platform controller hub (PCH) 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via a graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

Also, coupled to memory bus 116 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via a PCI bus 138. PCH 108 is further coupled to port(s), pin(s), and/or adapter(s) 130 over a bus 134. Generally, PCH 108 may be configured to handle various I/O operations, and PCH 108 may provide interfaces such as, for instance, Universal Serial Bus (USB), audio, serial, parallel, Ethernet, etc., via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is also coupled to basic input output system/unified extensible firmware interface (BIOS/UEFI) 140, super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IRS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processor(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. Super I/O Controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further comprises one or more network interface devices (NID(s)) 160 coupled to PCH 108 via a second PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a next PCI bus 182 to PCH 108. RAC 180 provides management functions that allow an administrator to deploy, monitor, manage, configure, update, troubleshoot, and/or remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186. In one embodiment, RAC 180 can be a separate device from IHS 100.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein. In the illustrative embodiment, IHS 100 further comprises a management device 190 that is in communication with network 170. Management device 190 can be another IHS, a computer, a server or a management console that enables a user or operator to receive operational conditions and manage functions of IHS 100. The addition of management device 190 is an optional feature to the embodiments described herein. Notably, in other embodiments, IHS 100 can also be a management device that connects via network 170 to one or more managed devices (not shown).

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

Figure 2A:
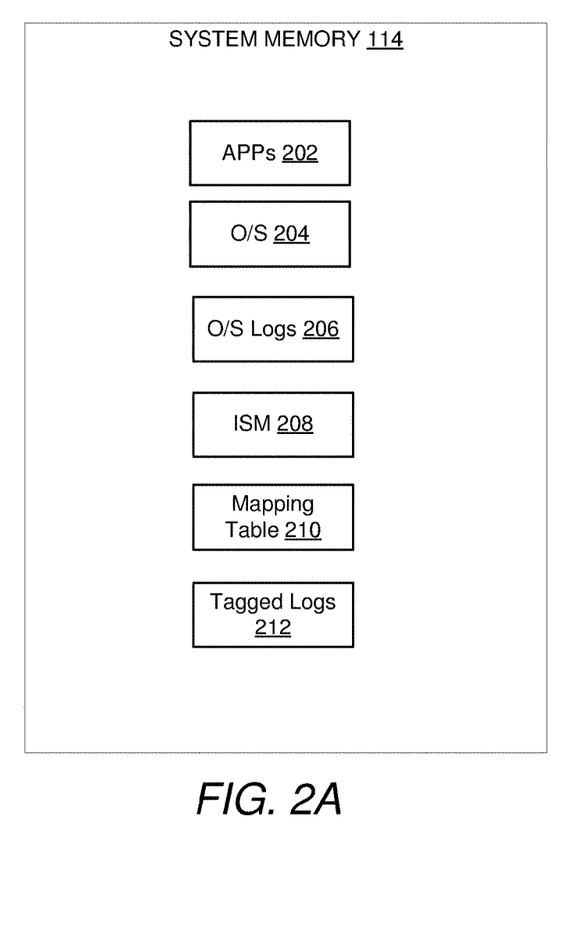
FIG. 2A illustrates example contents of a system memory in an IHS, in accordance with one embodiment.

With reference now to FIG. 2A, there is shown one embodiment of example contents of system memory 114 of IHS 100. System memory 114 includes data, software, and/or firmware modules including application(s) 202, operating system (O/S) 204 and OS logs 206. OS logs 206 contain software errors, events, conditions, and data regarding software events and problems of IHS 100. System memory 114 further includes integrated service module (ISM) firmware 208, mapping table 210, and tagged logs 212. ISM firmware 208 is a software and/or firmware module that executes on processor 102 to facilitate generating event logs in IHS 100. Mapping table 210 contains table entries that map OS or software events to corresponding hardware or subsystem component events. Tagged logs 212 contain OS logs that have been mapped and tagged for identification to corresponding hardware logs. System memory 114 can also include other data, software, and/or firmware modules.

Figure 2B:
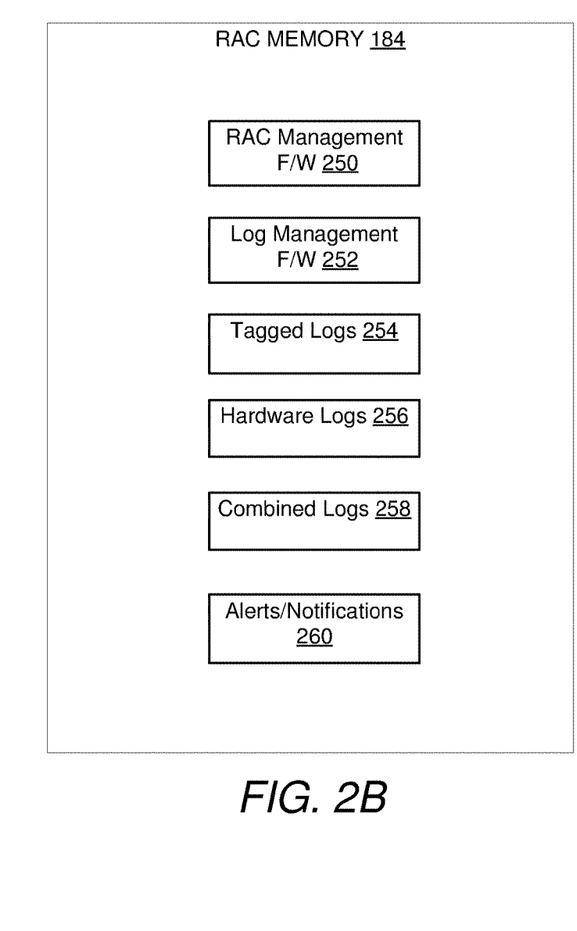
FIG. 2B illustrates example contents of a remote access controller (RAC) memory that includes firmware for generating event logs, in accordance with one embodiment.

Turning to FIG. 2B, there is shown one embodiment of example contents of RAC memory 184 of IHS 100. RAC memory 184 includes RAC management firmware 250 and log management firmware 252. RAC management firmware 250 is a software and/or firmware module that executes on RAC 180 to provide management functions that allow an administrator to deploy, monitor, manage, configure, update, troubleshoot, and/or remediate IHS 100. Log management firmware 252 is a software and/or firmware module that executes on RAC 180 to combine software and hardware event logs in a centralized location that enable software events to be tracked in the context of hardware events.

RAC memory 184 further includes tagged logs 254, hardware logs 256, combined event logs 258, and alerts/notifications 260. Tagged logs 254 are the tagged logs received from processor 102. Hardware logs 256 contain hardware errors, events, conditions and data regarding hardware events and problems of IHS 100. Combined logs 258 contain a combination of the tagged logs 254 and the hardware logs 256. Alerts/notifications 260 contain a log of alerts or notifications sent to management device 190. Alerts/notifications 260 can include simple network management protocol (SNMP) traps, web service (WS) events, and/or redfish events.

Figure 3:
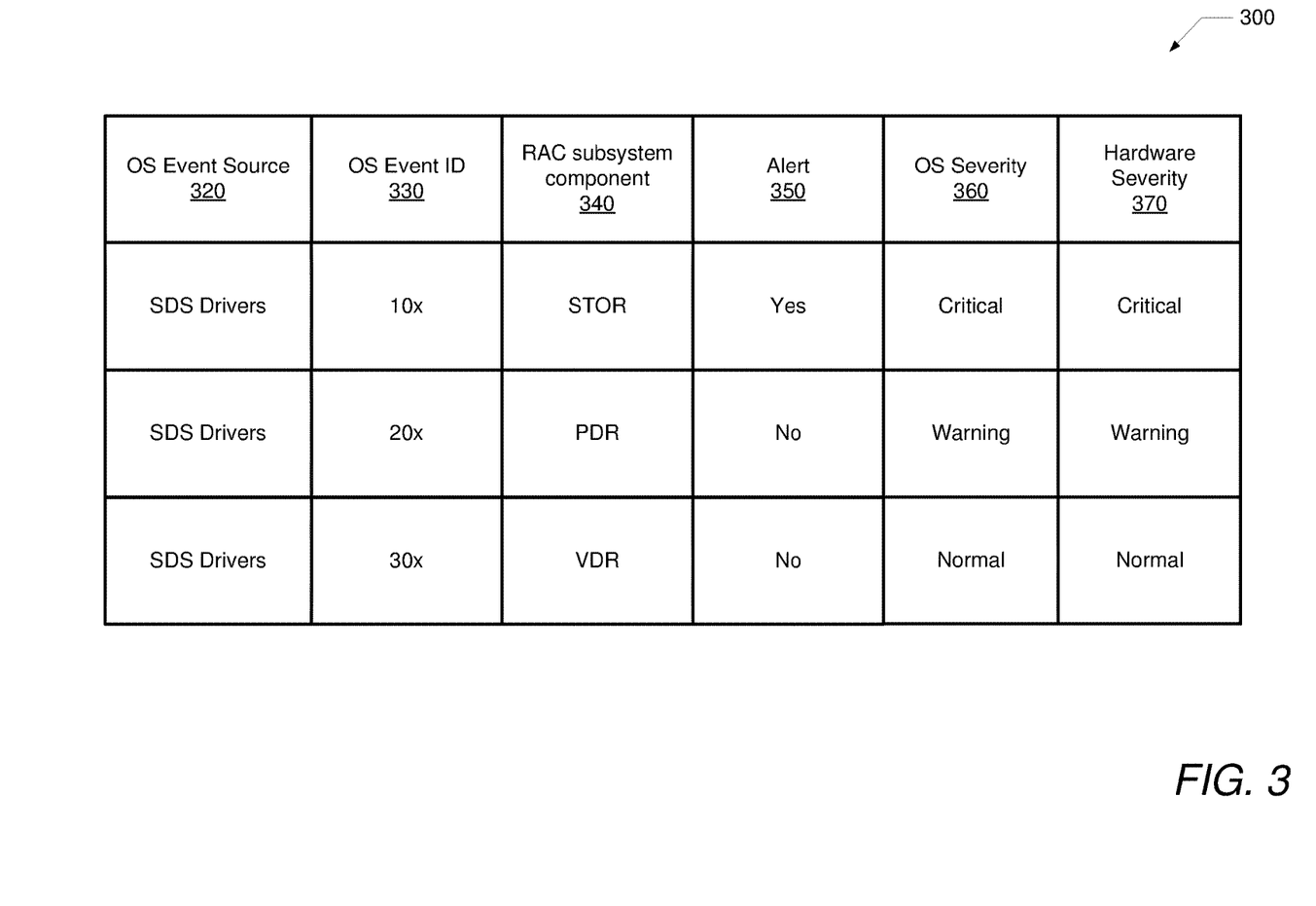
FIG. 3 illustrates an example of a tagged log for an IHS, according to one or more embodiments.

FIG. 3 illustrates example contents of a mapping table 300. Mapping table 300 contains fields and data that map OS or software events to corresponding hardware or subsystem component events. Mapping table 300 maps OS software events or modules to associated RAC hardware modules or RAC subsystem components. Mapping table 300 includes OS event source fields 320, OS event identifier fields 330, hardware event or RAC subsystem component fields 340, generate alert fields 350, OS severity level fields 360, and hardware severity level fields 370. OS event source fields 320 contain the source of OS events. OS event identifier fields 330 contain a unique identifier for each event. RAC subsystem component fields 340 contain the subsystem component or hardware events corresponding to OS events. Generate alert fields 350 contain information regarding whether a notification is required for specific events. OS severity level fields 360 contain information regarding the severity level of OS events that have occurred. Hardware severity level fields 370 contain information regarding the severity level of hardware events that have occurred.

In FIG. 3, the second row of mapping table 300 contains an OS event source field of "SDS drivers", an OS event identifier field of "20x", a RAC subsystem component mapping field of "physical disk (PDR)", a generate alert field of "no", an OS severity field of "warning", and a hardware severity field of "warning". The OS Event Source 320 is a software module that generates the event in the OS (in the second row, Storage Spaces Driver (SDS)). The OS event ID field 330 is the event id or a range of event ids of the event type. Every software module associates an identifier for a unique event type within the OS event source. OS severity field 360 is the severity of the event generated by the software module. The RAC subsystem component field 340 is the hardware module (or component) inside the RAC which roughly corresponds to the software module in the OS. The alert field 350 indicates whether an alert should be generated to a management device. The hardware severity field 370 indicates the severity of alert generated by the RAC.

Figure 4:
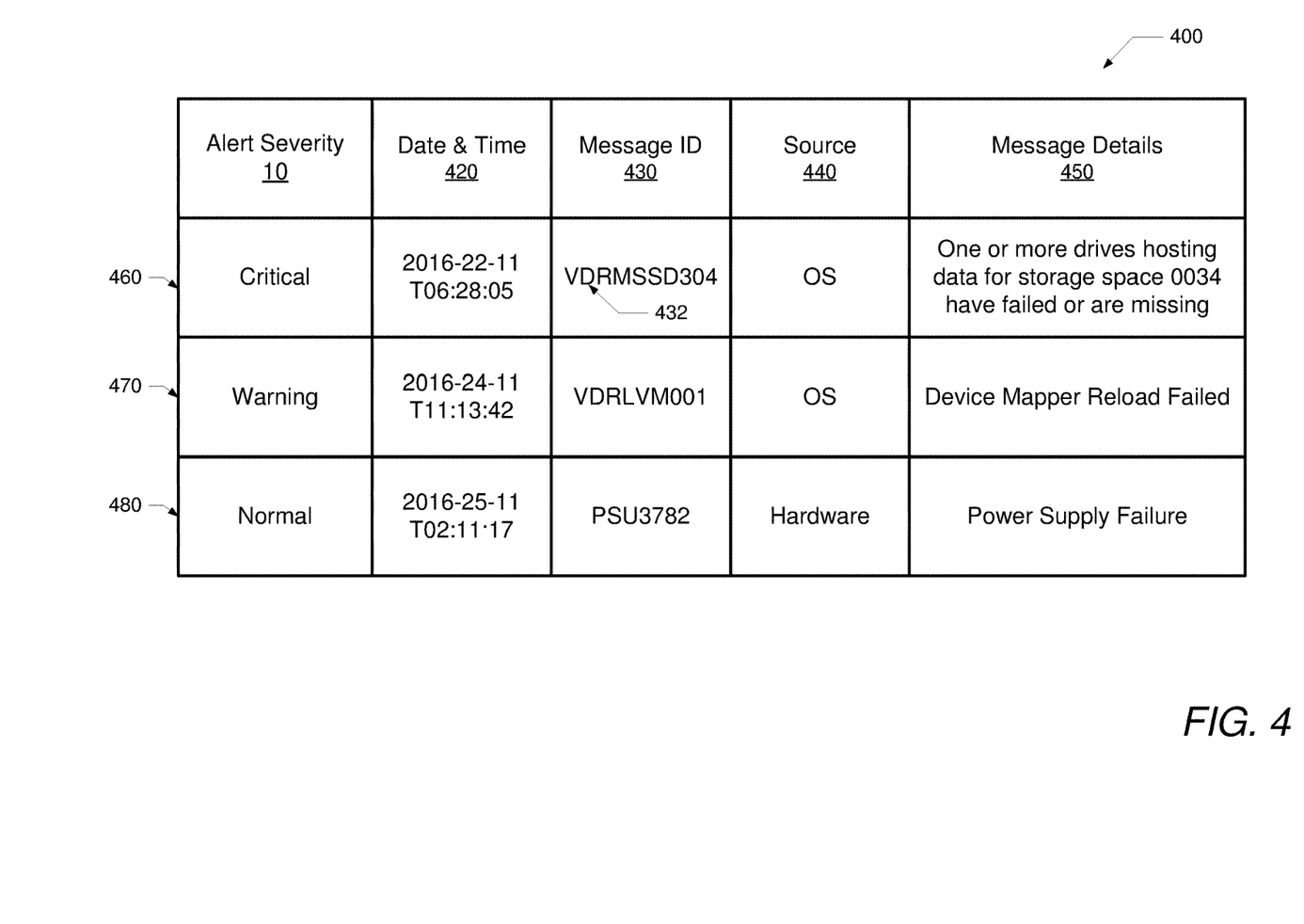
FIG. 4 illustrates an example of a combined log for an IHS, according to one or more embodiments.

FIG. 4 illustrates example contents of a combined event log 400. Combined event log 400 contains a combination of tagged logs 254 (FIG. 2) and hardware logs 256 (FIG. 2). Combined event log 400 includes alert severity column 410, date and time column 420, message ID column 430, source column 440, and message details column 450. Combined event log 400 further includes OS event rows 460, 470 and a hardware or subsystem component event row 480. Alert severity column 410 contains information regarding the severity of the event. Date and time column 420 contains information about the date and time the event occurred. Message ID column 430 includes message IDs (such as message ID 432) that contain information identifying the specific event. Source column 440 contains the OS event source (i.e. software or hardware) and message details column 450 contains a brief explanation of the event. The combined event log 400 has a uniform formatting and common syntax contained in the message IDs 430 for both OS logs and hardware logs.

During the generation of message ID 432, both OS events and hardware events are provided with a common syntax and uniform formatting. In one embodiment, message ID 432 can have several parts that are concatenated. For hardware based events, message ID 432 can be generated by concatenating a three character prefix (denoting the hardware component subsystem equivalent to OS Event source) and a number representing the message within the subsystem. For software or OS based events, the message ID can be generated by concatenating a three character prefix (denoting the hardware component subsystem) and a five character prefix (denoting the OS Event Source) and an event identifier (as defined in the software or OS).

For example, in FIG. 4, message ID 432 is shown as VDRMSSD304. Where VDR represents a virtual disk (hardware component subsystem). The Storage Spaces Volumes (in the SDS layer in the OS) generally corresponds to virtual disks monitored by the RAC. Storage spaces volume events are mapped to RAC VDR events. MSSD (Microsoft Storage Spaces Driver) is the name of the OS event source. The number 304 within example message ID 432 is the OS event type ID generated by the OS event source. Any 304 event generated by Microsoft storage spaces driver necessarily means the physical disk has failed or is missing. The message event id 432 is a combination of the hardware module, OS event source and the OS event ID (VDRMSSD304).

Figure 5:
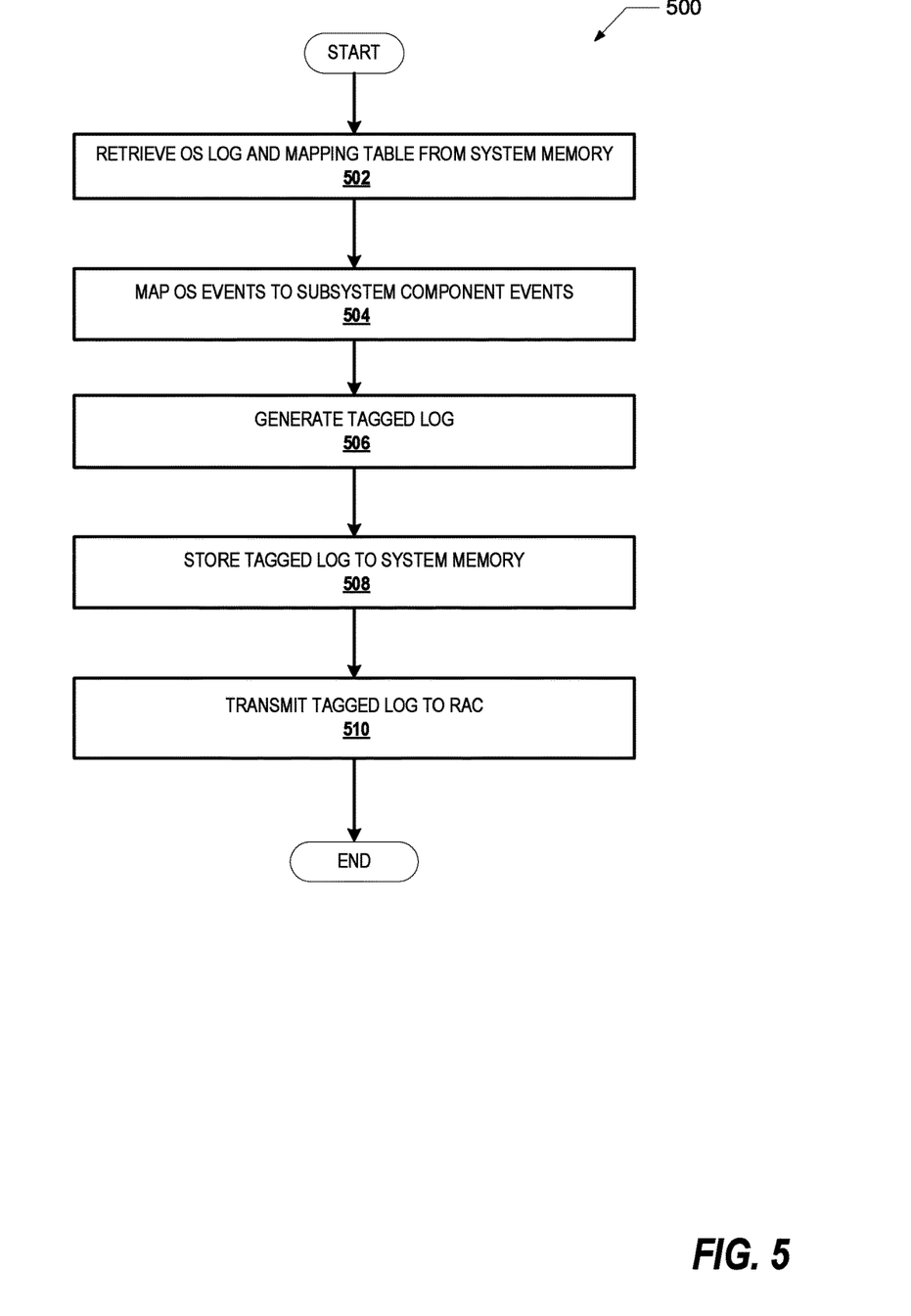
FIG. 5 is a flow chart illustrating one example of a method for generating a tagged log for an IHS.
Figure 6:
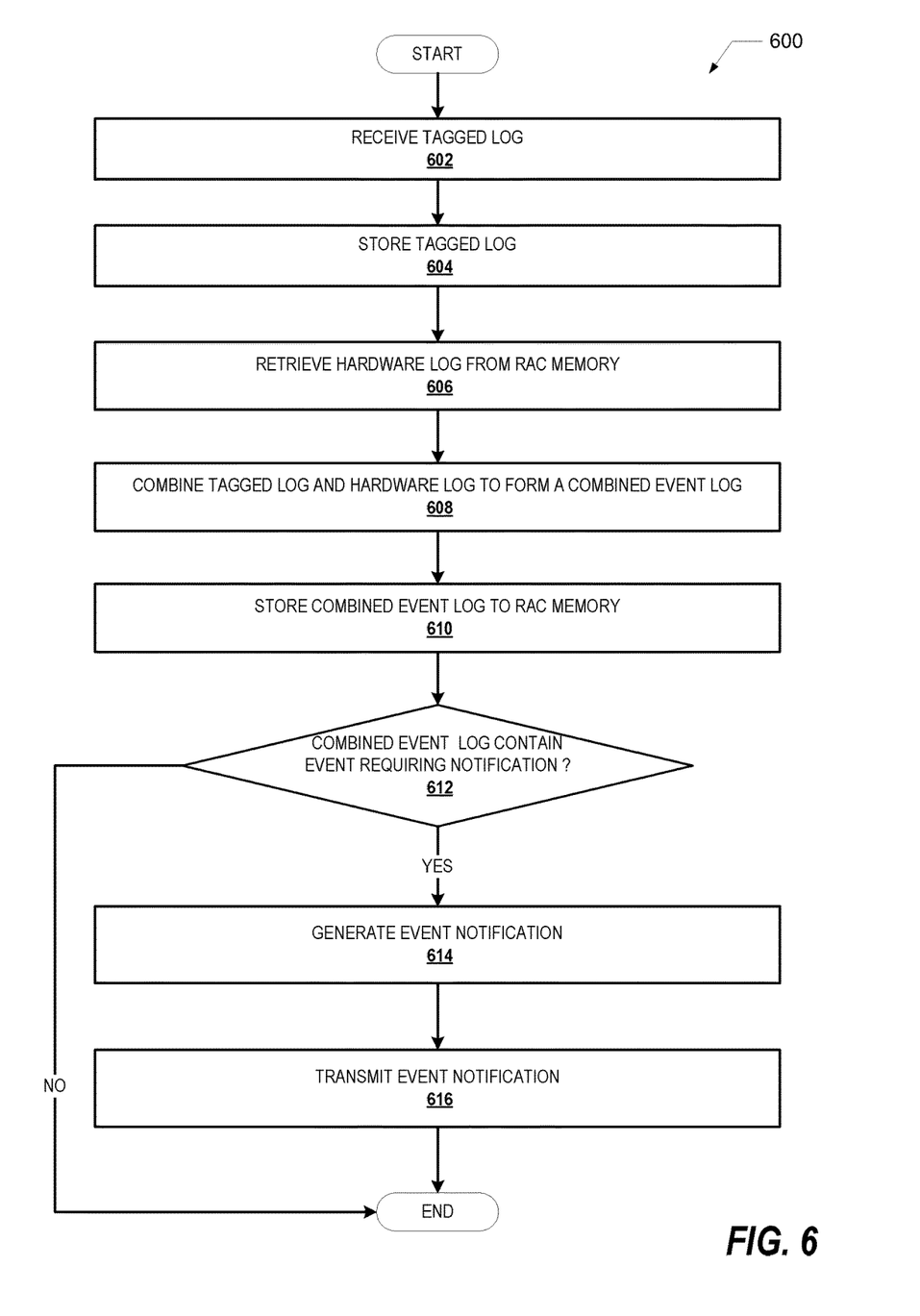
FIG. 6 is a flow chart illustrating one example of a method for combining software and hardware logs in an IHS.

FIGS. 5 and 6 illustrate flowcharts of exemplary methods 500 and 600 by which RAC 180 and processor 102 within the preceding figures performs different aspects of the processes that enable the one or more embodiments of the disclosure. Method 500 represents a computer-implemented method for generating a tagged log. Method 600 represents a computer-implemented method for combining software and hardware event logs. The description of methods 500 and 600 is provided with general reference to the specific components illustrated within the preceding FIGS. 1-4. Generally, method 500 is described as being implemented via processor 102 and particularly the execution of code provided by ISM firmware 208 acting within processor 102. Method 600 is described as being implemented via RAC 180 and particularly the execution of code provided by log management firmware 252 acting within RAC 180. It is however appreciated that certain aspects of the described methods may be implemented via other processing devices and/or execution of other code.

Referring to the flow chart of FIG. 5, method 500 begins at the start block and proceeds to block 502 where processor 102 retrieves OS logs 206 and mapping table 210 from system memory 114. Processor 102 maps at least one OS event contained in OS logs 206 to at least one subsystem component event, based on the mapping table (block 504). Processor 102 generates a tagged log 212 based on the mapped subsystem component events in real time (block 506). Processor 102 stores the tagged log 212 to the system memory 114 (block 508) and transmits the tagged log 212 to RAC 180 (block 510). Each time an OS event is generated, processor 102 updates the OS log and sends the OS log to RAC 180. Method 500 then ends.

FIG. 6 illustrates a method 600 for combining software and hardware event logs. Referring to the flow chart of FIG. 6, method 600 begins at the start block and proceeds to decision block 602 where RAC 180 receives one or more tagged logs 212 from processor 102. RAC 180 stores the received tagged logs to RAC memory 184 as tagged logs 254 (block 604). RAC 180 retrieves one or more hardware logs 256 containing hardware event data from RAC memory 184 (block 606). RAC 180 combines the tagged log 254 and the hardware log 256 to generate or form a combined event log 258 containing both OS event data and hardware event data (block 608). The hardware log 256 is maintained by RAC 180. Logs from different components are appended to hardware log 256 in the same order they are received. In the case of the combined log 258, the tagged log received from processor 102 is added or combined with the hardware log to generate the combined log. During the generation of message ID 432 within combined event log 258, both OS events and hardware events are provided with a common syntax and uniform formatting. Message ID 432 contains both OS events and hardware events that have a common syntax and uniform formatting. RAC 180 stores the combined event log 258 to RAC memory 184 (block 610). In one embodiment, RAC 180 can store the combined event log 258 to a RAC storage device such as a hard drive or solid state drive.

RAC 180 determines if the combined event log 258 contains an event that requires notification to an operator or management device 190 (decision block 612). In response to there being no events that require notification to an operator or management device, method 600 terminates. In response to there being an event that requires notification to an operator or management device, RAC 180 generates an alert or event notification (block 614) and transmits the alert or event notification to the operator or management device 190 (block 616). Method 600 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of providing a combined event log in an information handling system (IHS), the method comprising:
   receiving, via a remote access controller (RAC) from a processor, a tagged log containing operating system (OS) event data, the tagged log generated by the processor by:
   retrieving, via a processor, an OS log and a mapping table from a system memory, the OS log containing at least one OS event and the mapping table containing at least one subsystem component event corresponding to the OS event, mapping the at least one OS event from the OS log to the at least one subsystem component event based on the mapping table, and
   generating the tagged log based on the at least one subsystem component event; retrieving, from a RAC memory, a hardware log containing hardware event data; combining the tagged log and the hardware log to form the combined event log containing both OS event data and hardware event data in a uniform format; storing the combined event log to the RAC memory;
   identifying if the combined event log contains an event that requires notification to a management device; and
   in response to identifying that the combined event log contains an event requiring notification to a managing device: generating a first event notification;
   transmitting, via a network, the first event notification to the management device.

2. The method of claim 1, further comprising:
   storing, by the processor, the tagged log to the system memory; and
   transmitting the tagged log to the RAC.

3. The method of claim 2, wherein the tagged log further comprises:
   a first event message identifier;
   a first event severity value; and
   a first event source identifier.

4. The method of claim 3, wherein the first event message identifier is generated by concatenating a first value denoting a first component subsystem, a second value representing a first event source and a third value corresponding to an OS event identifier, and the first event message identifier represents the uniform format for both the OS event data and hardware event data.

5. The method of claim 1, wherein the mapping table further comprises at least one of:
   an OS severity level;
   a hardware severity level; and
   an alert.

6. The method of claim 1, wherein combining the tagged log and the hardware log to form the combined event log further comprises:
   appending the tagged log to the hardware log in the order that the tagged log is received by the RAC.

7. An information handling system (IHS) comprising:
   a processor communicatively coupled to a system memory;
   a remote access controller (RAC) communicatively coupled to the processor and to a RAC memory device, the RAC including first firmware executing thereon to provide a combined event log, wherein the first firmware configures the RAC to:
   receive, from the processor, a tagged log containing operating system (OS) event data;
   retrieve from the RAC memory device, a hardware log containing hardware event data;
   combine the tagged log and the hardware log to form the combined event log containing both OS event data and hardware event data in a uniform format;
   store the combined event log to the RAC memory;
   identify if the combined event log contains an event that requires notification to a management device;
   in response to identifying that the combined event log contains an event requiring notification to a managing device:
   generate a first event notification; and
   transmit, via a network, the first event notification to the management device;
   wherein the tagged log is generated by the processor executing second firmware, which configures the processor to:
   retrieve an OS log and a mapping table from a system memory, the OS log containing at least one OS event and the mapping table containing at least one subsystem component event corresponding to the OS event;

map the at least one OS event from the OS log to the at least one subsystem component event based on the mapping table; and generate the tagged log based on the at least one subsystem component event.

8. The information handling system of claim 7, wherein the processor further:

stores the tagged log to the system memory; and transmits the tagged log to the RAC.

9. The information handling system of claim 7, wherein the mapping table further comprises at least one of:

an OS severity level;

a hardware severity level; and an alert.

10. The information handling system of claim 7, wherein the tagged log further comprises:

a first event message identifier;

a first event severity value; and a first event source identifier.

11. The information handling system of claim 10, wherein the first event message identifier is generated by concatenating a first value denoting a first component subsystem, a second value representing a first event source and a third value corresponding to an OS event identifier and the first event message identifier represents the uniform format for both the OS event data and hardware event data.

12. The information handling system of claim 7, wherein combining the tagged log and the hardware log to form the combined event log further comprises the first firmware configuring the RAC to: append the tagged log to the hardware log in the order that the tagged log is received by the RAC.

13. An event logging system comprising:

a processor communicatively coupled to a system memory and which executes a second firmware, which configures the processor to:

retrieve an OS log and a mapping table from a system memory, the OS log containing at least one OS event and the mapping table containing at least one subsystem component event corresponding to the OS event;

map the at least one OS event from the OS log to the at least one subsystem component event based on the mapping table; and generate the tagged log based on the at least one subsystem component event; and a remote access controller (RAC) communicatively coupled to the processor and to a RAC memory device, the RAC including first firmware executing thereon to provide a combined event log, wherein the first firmware configures the RAC to:

receive a tagged log containing operating system (OS) event data;

retrieve from the RAC memory device, a hardware log containing hardware event data;

combine the tagged log and the hardware log to form the combined event log containing both OS event data and hardware event data in a uniform format;

store the combined event log to the RAC memory;

identify if the combined event log contains an event that requires notification to a management device; and in response to identifying that the combined event log contains an event requiring notification to a managing device:

generate a first event notification; and transmit, via a network, the first event notification to the management device.

14. The event logging system of claim 13, wherein the processor:

stores the tagged log to the system memory; and transmits the tagged log to the RAC.

15. The event logging system of claim 13, wherein the mapping table further comprises at least one of:

an OS severity level;

a hardware severity level; and an alert.

16. The event logging system of claim 13, wherein the tagged log further comprises:

a first event message identifier;

a first event severity value; and a first event source identifier.

17. The event logging system of claim 16, wherein the first event message identifier is generated by concatenating a first value denoting a first component subsystem, a second value representing a first event source and a third value corresponding to an OS event identifier and the first event message identifier represents the uniform format for both the OS event data and hardware event data.

* * * * *